United States Patent [19]

Okamoto et al.

[11] 4,026,795
[45] May 31, 1977

[54] METHOD FOR THE REGENERATION OF ACTIVATED CARBON

[75] Inventors: Hiroshige Okamoto, Sakai; Shiro Watanabe; Katsumi Yuasa, both of Kurashiki; Mitsuo Takano, Sakai; Itaru Fukinbara; Nobumitsu Yano, both of Tokyo, all of Japan

[73] Assignee: Asahi Kasei Kogyo Kabushiki Kaisha, Osaka, Japan

[22] Filed: Nov. 6, 1975

[21] Appl. No.: 629,733

[30] Foreign Application Priority Data

Nov. 7, 1974 Japan ............................ 49-128314

[52] U.S. Cl. ............................. 210/30 A; 252/414
[51] Int. Cl.[2] ........................................ B01D 15/06
[58] Field of Search ................ 210/30 R, 21, 30 A; 252/411, 414; 260/621 A, 627 R

[56] References Cited

UNITED STATES PATENTS

| | | | |
|---|---|---|---|
| 2,768,977 | 10/1956 | Auvil et al. | 210/21 X |
| 2,807,654 | 9/1957 | Grimmett et al. | 210/21 X |
| 3,274,104 | 9/1966 | Hamilton | 252/411 R X |

*Primary Examiner*—Frank A. Spear, Jr.
*Assistant Examiner*—E. Rollins Cross
*Attorney, Agent, or Firm*—Burgess, Dinklage & Sprung

[57] ABSTRACT

Method for the regeneration of an activated carbon having adsorbates adsorbed therein characterized by removing the adsorbates by liquid dimethyl ether or a mixture of liquid dimethyl ether and water. By such method, the spent carbon can be effectively regenerated without degrading the absorption capacity and mechanical strength thereof. Further, valuable substances in the desorbed adsorbates can be effectively concentrated and recovered by a simple additional operation.

7 Claims, No Drawings

METHOD FOR THE REGENERATION OF ACTIVATED CARBON

This invention relates to a method for the regeneration of an activated carbon having adsorbates adsorbed therein. More particularly, the invention relates to a method in which activated carbons having adsorbates adsorbed therein can be effectively regenerated without degrading the absorption capacity and mechanical strength by removing the adsorbates by liquid dimethyl ether or a mixture of liquid dimethyl ether and water, and to a method in which valuable substances in the desorbed adsorbates can be effectively concentrated and recovered.

Activated carbon has heretofore been used in the processes for recovery, purification and separation of industrial unit operations, for example, widely used for decolorization, deodorizing and refining of intermediate products and final products in the food industry, chemical industry and pharmaceutical industry, and for high-grade treatment of the exhaust gas and waste water treatments and water treatment. In order to use the activated carbon economically on an industrial scale, spent carbons must be regenerated before they are used again. Various regeneration methods have heretofore been proposed and practiced, but all of these conventional methods are still insufficient with respect to regeneration efficiency and maintenance of the mechanical strength of the regenerated activated carbons. Therefore, development of an effective and economical regeneration method has been eagerly desired in the art.

As the conventional method for regeneration of activated carbon, there can be mentioned a low temperature heating method comprising heating spent carbon at a temperature of 100° to 400° C. with steam or the like, a high temperature heating method comprising heating spent carbon at a temperature of 600° to 1000° C., a regeneration method using a high temperature inert gas, a chemical regeneration method using an acid or alkali, a wet oxidation method, a microbial decomposition method, etc. Activated carbon used for liquid phase, however, cannot be regenerated unless it is subjected to the high temperature heating method, namely a re-activation or a thermal regeneration method in which regeneration is effected under the same conditions as adopted for production of activated carbon. Further, regeneration conditions such as the amount of steam and the residence time in a regenerating furnace vary depending on amount and properties of activated carbons. Therefore, in general, regeneration loss is increased by prolongation of the residence time, excessive incorporation of air and the like, and simultaneously, the mechanical strength is reduced in the regenerated activated carbon. Furthermore, in some cases the exhaust gas from the regenerating furnace causes secondary air pollution. Still in addition, the handling loss at the regenerating step increases the total regeneration loss. On the other hand, the chemical regeneration method in which high temperature heating is not conducted is advantageous in that the regeneration loss can be reduced, but the degree of regeneration is insufficient and lower than in the thermal regeneration method and both the waste coming from the spent carbon and the chemicals used for regeneration should be treated completely. Accordingly, from the economical viewpoint it is difficult to practice this method, except a few special cases. Further, neither the wet oxidation method nor the microbial decomposition method has yet been developed beyond the stage of research. Various methods as mentioned above have heretofore been proposed and attempted for regeneration of activated carbon. But it is only granular activated carbon that can now be regenerated. Powdered activated carbon which has higher adsorption rate and hence is capable of adsorbing a larger amount than granular activated carbon is thrown away after use without regeneration because the loss by thermal regeneration is so large that regeneration is of no economical significance. Accordingly, development of a regeneration method which will be able to overcome these defects involved in the conventional methods and to perform regeneration at a high regeneration rate with lessened regeneration loss and which can regenerate even powdered activated carbon with economical advantages has been highly demanded in the art.

As a result of intensive investigations made on regeneration of activated carbon, we have now succeeded in developing novel activated carbon regeneration process which can satisfy the abovementioned demands held in the art.

In accordance with this invention, there is provided a method for regeneration of spent carbon having absorbed therein adsorbates soluble or dispersible in liquid dimethyl ether or water (for example, organic solvents such as phenol, benzene and xylene, synthetic detergents such as alkyl benzenesulfornates, dyes such as Methylene Blue, BTB and Cresol Red, vitamins such as vitamin A and tocopherol, fats and oils such as soybean oil and palm oil, pollutants in city sewage, pollutants in industrial wastes, caramel color in molasses, and the like), which comprises contacting a spent carbon having an adsorbate adsorbed therein with liquid dimethyl ether or a mixture of liquid dimethyl ether and water, to thereby desorb the adsorbates from the carbon and regenerate it.

In accordance with this invention, there is also provided a method of the above character, which includes the step of concentrating and recovering valuable substances from the desorption liquid obtained in the above regeneration method.

More specifically, according to the regeneration method of this invention, adoption of complicated operation steps or complicated apparatuses is quite unnecessary, and regeneration can be usually accomplished very simply by contacting a spent carbon with liquid dimethyl ether or a mixture of liquid dimethyl ether and water by agitation, column extraction, etc., under pressure and temperature conditions sufficient to keep dimethyl ether in the state of liquid (under a pressure of 3 to 5 $Kg/cm^2$ at room temperature or at a temperature lower than $-25°$ C. under atmospheric pressure) and separating from the activated carbon a dimethyl ether solution containing the desorbed adsorbates or a dimethyl ether solution containing the desorbed adsorbates and water by centrifugal separation, filtration, etc.

The majority of the residual dimethyl ether left in the activated carbon can easily be separated under normal temperature and pressure conditions, and the remaining trace of dimethyl ether can be completely removed by elevating the temperature slightly or reducing the pressure slightly. In contrast, when diethyl ether, chloroform, petroleum ether, hexane or the like is used as the desorption solvent or regenerant, even if desorption be accomplished, the desorption solvent is adsorbed in the activated carbon, and hence, no good regeneration of activated carbon can be attained. Further, when dimethyl ether is, according to this invention, employed as the desorption solvent, separation of the desorbed adsorbates from dimethyl ether can easily be accomplished under normal temperature and pressure conditions, and the separation can be enhanced by slight adjustment of the pressure or temperature according to need. The separated dimethyl ether can be refined according to need, and it may be liquefied and used again for regeneration.

When the adsorbates are valuable or the adsorbates contain valuable substances, these valuable substances can easily be recovered in the concentrated form by removing by evaporation dimethyl ether from the desorption liquid. In the prior art, organic gases such as benzene, toluene and xylene are desorbed and recovered from activated carbon by the steam heating method. In this case, however, it is difficult to separate these organic solvents from condensed water after desorption and provision of a distillation column or rectification column is indispensable for accomplishing this separation. Furthermore, in order to remove organic solvents from condensed water left after the above column treatment, the condensed water should be further treated. In contrast, in the method of this invention using liquid dimethyl ether, these organic solvents can easily be separated completely from dimethyl ether only by provision of a distillation column of a simple structure and therefore, such post treatments as mentioned above need not be performed.

Dimethyl ether is relatively chemically stable and does not form a peroxide or condensate under normal conditions. It can be obtained as a by-product in the production of methanol or can easily be prepared from methanol at a low cost. Further, dimethyl ether has a molecular weight of 46 and a molecular crossing diameter as small as 5A, and is somewhat polar despite its being an ether. Moreover, dimethyl ether has only a superior permeability into a substance to other solvents but also a mutual solubility with water; namely, at 20° C, 54 g. of dimethyl ether are soluble in 100 g. of water while 6.3 g. of water are soluble in 100 g. of dimethyl ether. Therefore, when water is present therewith, dimethyl ether has a more potent extracting power for treating a spent carbon having hydrophilic substances adsorbed therein, as will be mentioned later. Furthermore, dimethyl ether has a low boiling point of −24.9° C. under atmospheric pressure and is easily vaporizable or dispersible at ordinary temperature under atmospheric pressure. The dimethyl ether can be readily separated from extract and thus any valuable substances when contained may also be readily recovered.

According to the method of the present invention, the spent carbon having an oleophilic substance and/or a hydrophilic substance adsorbed therein may be treated with liquid dimethyl ether alone. But, when the spent carbon has a hydrophilic substance adsorbed therein, it is advantageously treated with a mixture of liquid dimethyl ether and water. When the spent carbon having a hydrophilic substance adsorbed therein is treated with liquid dimethyl ether alone, a longer period of time is needed for the treatment.

In general, industrial wastes or city sewages contain, as pollutants, both of hydrophilic and oleophilic substances. It is noted that when activated carbons have been used for the treatment of such industrial wastes or city sewages, the spent carbons usually contain water. Therefore, even if any additional water is not employed in addition to liquid dimethyl ether, the regeneration system contains liquid dimethyl ether and water. In such case, the method of the present invention can be advantageously carried out without employing any additional water.

In practising the method of the present invention in which liquid dimethyl ether alone is used there may be employed in the regeneration system a weight ratio of 1/0.5 − 50 (spent carbon/liquid dimethyl ether), more preferably 1/10 − 20. When the mixture of liquid dimethyl ether and water is used as the regenerant, there may be employed in the regeneration system a weight ratio of 1/0.1 − 25/0.5 − 50 (spent carbon/water/liquid dimethyl ether), more preferably 1/0.5 − 5/10 − 20.

As described before, if the adsorbate is a hydrophilic substance, it is preferred to use a mixture of dimethyl ether and water. In this case, good results are obtained only by incorporating water into dimethyl ether in an amount sufficient to dissolve the hydrophilic adsorbate therein. It is most preferable to effect desorption under such a condition that the amount of water which is present with dimethyl ether exceeds saturation solubility.

Contact period of time between spent carbon and the solvent may vary depending upon the ratio of water to dimethyl ether, solubility of adsorbates in water and dimethyl ether, dispersion rate and particle size of activated carbon, but there is usually and satisfactorily employed about 5 − 60 minutes, in many cases, 5 − 30 minutes.

The following three great advantages can be attained by this invention.

1. In the method of this invention, regeneration can be accomplished regardless of the phase or state where the activated carbon is used. Namely, the activated carbon can be regenerated in the same state as it is actually used for adsorption, without performing drying or the like. For instance, activated carbon in the liquid phase or containing a large amount of water, such as activated carbon used for the waste water treatment, can be regenerated in the liquid-rich state as such, because of mutual solubility between dimethyl ether and water.

2. Regeneration can be accomplished at optional temperatures, for example, at room temperature. Therefore, troubles observed at the thermal regeneration, such as degradation of activated carbon, carbonization of adsorbates and deposition of ashes on activated carbon, can be prevented in the method of this invention, and regeneration loss or degradation is not caused at all in the method of this invention. Owing to this advantage, the method of this invention can be an effective method for regeneration of powdered activated carbon. For the regeneration of powdered activated carbon, there may be applied the same conditions and operations as in the regeneration of granular activated carbon.

3. In the method of this invention, a complicated device need not be provided for regeneration and the spent carbon is not necessarily shifted for regeration. If only liquid dimethyl ether is introduced into the adsorption apparatus by the valve operation, the adsorption apparatus serves as a regeneration apparatus. Therefore, as compared with the conventional methods, the method of this invention is much advantageous in that handling loss of the activated carbon during the regeneration operation can be greatly reduced and mechanical wearing of the activated carbon or reduction of the strength is eliminated.

As is apparent from the foregoing description, this invention provides a novel effective method for regeneration of an activated carbon which are used for gas phase adsorption or liquid phase adsorption.

This invention will be more fully illustrated by the following Experiments and Examples, but they are not limiting the scope of this invention.

EXPERIMENT 1

Granular activated carbon (sold under tradename "Adgencoal" and manufactured by Adgen Kabushiki Kaisha Japan) used for the treatment of synthetic detergent (mainly comprising dodecylbenzenesulfonic acid)-containing waste water was treated according to the regeneration method of this invention and according to the conventional thermal regeneration method using an electric furnace of the rotary kiln type. Both regeneration methods were compared by measuring the iodine adsorption and caramel decolorizing degree (according to the method JIS K-1470 for testing method for powdered activated carbon), the bulk density, the ash content and the particle size distribution with respect to virgin carbon, spend carbon and regenerated carbon. The regeneration according to the method of this invention was performed in the following manner. A column-type continuous extractor having a column of an inner capacity of 1 liter was charged with 100 g. (in terms of the dry weight of virgin carbon) of spent carbon, and continuous extraction was conducted for 15 minutes at a temperature of 25° C. and a pressure of 4.2 Kg/cm² while passing liquid dimethyl ether at a flow rate of 50 ml/min. After this washing regeneration of activated carbon, the activated carbon was filtered from the dimethyl ether solution by using a 100-mesh wire net. The dimethyl ether solution was subjected to fractional distillation in a closed system with a temperature gradient of 40° – 18° C. and evaporated dimethyl ether was liquefied and recovered. The activated carbon was allowed to stand at 25° C. and 20 mm Hg for 30 minutes to evaporate and remove the residual dimethyl ether. The resulting activated carbon was then subjected to the test.

The regeneration according to the thermal regeneration method was conducted in the following manner. An electric furnace of the rotary kiln type was charged with 100 g. (in terms of the dry weight of virgin carbon) of the same activated carbon as mentioned above, and the thermal regeneration was carried out at a regeneration temperature of 800° C. for 15 minutes while feeding stream at a rate of 50 g/hr. The resulting activated carbon was tested.

The results thus obtained are shown in Table 1, from which it will readily be understood that the regeneration method of this invention is superior to the thermal regeneration method with respect to the regeneration rate of activated carbon and prevention of reduction of the mechanical strength of the regenerated carbon.

Table 1

| Test Item | Regenerated Carbon Thermal Regeneration Method | Regenerated Carbon Method of This Invention | Spent Carbon | Virgin Carbon |
|---|---|---|---|---|
| dry weight (g) after regeneration | 89 | 99 | — | — |

Table 1-continued

| | Regenerated Carbon Thermal Regeneration Method | Regenerated Carbon Method of This Invention | Spent Carbon | Virgin Carbon |
|---|---|---|---|---|
| bulk density, g/ml | 0.54 | 0.51 | 0.59 | 0.51 |
| ash content % | 5.8 | 3.6 | 5.5 | 3.5 |
| Iodine absorption, mg/g | 1020 | 1078 | 660 | 1100 |
| caramel deodorizing degree, % | 80.6 | 93.5 | 70.0 | 93.8 |
| particle size distribution (%) | | | | |
| larger than 12 mesh | 1.0 | 2.1 | 2.1 | 4.8 |
| 12–14 mesh | 13.2 | 29.5 | 29.4 | 23.4 |
| 14–16 mesh | 22.8 | 30.7 | 30.9 | 23.4 |
| 16–20 mesh | 24.4 | 19.7 | 19.7 | 19.6 |
| 20–28 mesh | 29.8 | 15.7 | 15.6 | 19.2 |
| 28–32 mesh | 4.9 | 2.0 | } 2.3 | 2.9 |
| 32–42 mesh | 3.3 | } 0.3 | | } 6.9 |
| smaller than 42 mesh | 0.8 | | | |

EXPERIMENT 2

30 g. of benzene was adsorbed in 100 g. (dry weight) of granular activated carbon (sold under tradename "Adgencoal" and manufactured by Adgen Kabushiki Kaisha), and the benzene-adsorbing activated carbon was charged in a pressure vessel having a capacity of 1 liter and equipped with a magnetic stirrer and 300 g. of liquid dimethyl ether was introduced under pressure into the vessel. The contents were agitated (40 cycles per minute) for 30 minutes at a temperature of 25° C. and a pressure of 42 Kg/cm² to effect extraction of benzene and regeneration of the activated carbon. Then, the activated carbon was separated from the dimethyl ether solution according to the customary filtration method using a 100-mesh wire net. The dimethyl ether solution was subjected to fractional distillation in a closed system at a temperature gradient of 40° – 18° C. and the evaporated dimethyl ether was liquefied and recovered. The amount of benzene contained in the residual liquid was determined. The separated activated carbon was allowed to stand at 25° C. and 20 mm Hg for 30 minutes to remove the residual dimethyl ether by evaporation, and then, the weight of the activated carbon was determined. The foregoing procedures were repeated twice or three times and the above measurements were similarly connected. The results thus obtained are shown in Table 2.

Table 2

| Test Item | Number of Repetition of Treatment 1 | 2 | 3 |
|---|---|---|---|
| amount, g, of recovered benzene | 28 | 29 | 30 |
| (benzene recovery rate, %) | (90.3) | (96.7) | (100) |
| dry rate, g, of regenerated activated carbon | 103 | 101 | 99 |

EXPERIMENT 3

6 g. of a dye, Procion Red, was adsorbed in 150 g. of granular activated carbon (sold under tradename "Adgencoal" and manufactured by Adgen Kabushiki Kaisha), and the dye-absorbing activated carbon was divided into 3 portions, each having a weight of 52 g. One of them was used as a sample of the spent carbon, and the remaining two portions were treated with dimethyl ether alone and a dimethyl ether-water mixture, respectively (referred to as regenerated carbon I and regenerated carbon II). The iodine adsorption and caramel-decolorizing degree were determined with respect to each of these spent carbon, regenerated carbon I, regenerated carbon II and virgin carbon.

The treatment with dimethyl ether alone was conducted in the following manner. A pressure vessel having a capacity of 1 liter and equipped with a magnetic stirrer was charged with 52 g. of the above used carbon, and 100 g. of liquid dimethyl ether was introduced into the vessel under pressure. The extraction regeneration treatment was conducted at a temperature of 25° C. and a pressure of 4.2 Kg/cm$^2$ for 15 minutes under agitation (100 cycles per minute), and the regenerated activated carbon was separated from the dimethyl ether solution according to the customary filtration method using a 100-mesh wire net. The above procedures were repeated three times, and the activated carbon was allowed to stand at 40° C. and 20 mm Hg for 30 minutes to remove the residual dimethyl ether sticking onto the activated carbon.

The treatment with the dimethyl ether-water mixture was conducted in the following manner. A pressure vessel having a capacity of 1 liter and equipped with a magnetic stirrer was charged with 52 g. of the above spent carbon and 40 g. of water, and 100 g. of liquid dimethyl ether was introduced into the vessel under pressure. The extraction regeneration treatment was carried out at a temperature of 25° C. and a pressure of 4.2 Kg/cm$^2$ for 15 minutes under agitation (100 cycles per minute). Then, the activated carbon was separated from the dimethyl ether solution according to the customary filtration method using a 100-mesh wire net. The above procedures were repeated three times while adding 40 g. of water each item. The so regenerated activated carbon was allowed to stand at 40° C. and 20 mm Hg for 30 minutes to remove the residual dimethyl ether sticking onto the activated carbon.

The results thus obtained are shown in Table 3.

Table 3

| Test Item | Regenerated Carbon I | Sample Regenerated Carbon II | Spent Carbon | Virgin Carbon |
|---|---|---|---|---|
| Iodine Adsorption, mg/g | 1200 | 1570 | 800 | 1580 |
| Caramel Decolorizing Degree, % | 80 | 96 | 70 | 98 |

EXAMPLE 1

Granular activated carbon (sold under tradename "Adgencoal" and manufactured by Adgen Kabushiki Kaisha) used for the treatment of synthetic detergent (mainly comprising dodecylbenzenesulfonic acid)-containing waste water was regenerated by the regeneration method of this invention and the conventional thermal regeneration method, respectively. The ABS value (Japanese Service Water Association standard, JWWA K-113) and caramel decolorizing degree were determined with respect to each of virgin carbon, spent carbon and regenerated carbon.

The regeneration according to the method of this invention was conducted in the following manner. A pressure vessel having a capacity of 1 liter and equipped with a magnetic stirrer was charged with 100 g. (88 g. in terms of virgin carbon) of undried spent carbon having a water content of 5%, and 300 g. of liquid dimethyl ether was introduced under pressure into the vessel. Extraction was conducted for 60 minutes at a temperature of 25° C. and a pressure of 4.2 Kg/cm$^2$ under agitation (40 cycles per minute), and in the same manner as described in Experiment 1, the dimethyl ether solution was filtered and the washed activated carbon was allowed to stand still at 25° C. and 20 mm Hg for 30 minutes to remove the residual dimethyl ether by evaporation. The so obtained regenerated carbon (53 g.) was tested as the sample regenerated according to the method of this invention.

The regeneration according to the thermal regeneration method was conducted in the following manner. Namely, 50 Kg. of the same spent carbon as mentioned above was charged in a multi-staged furnace and heated at a regeneration temperature of 850° to 950° C. for 30 minutes while feeding steam at a rate of 40 Kg/hr. The so regenerated activated carbon (27 Kg.) was tested as the comparative sample regenerated according to the conventional method.

Test results are shown in Table 4.

Table 4

| Test Item | Regenerated Carbon Sample Regenerated according to Thermal Regeneration Method | Regenerated Carbon Sample Regenerated according to Method of This Invention | Spent Carbon | Virgin Carbon |
|---|---|---|---|---|
| ABS Value* | 27 | 26 | 80 | 24 |
| Caramel Decolorizing Degree, % | 91 | 91 | 61 | 92 |

*ABS Value: An amount of activated carbon to be required for bringing the residual ABS amount of a 5.0 ppm solution of ABS to 0.5 ppm in 1 hour.

EXAMPLE 2

Granular activated carbon (sold under tradename "Kuraray Coal GLC" and manufactured by Kuraray Chemical Kabushiki Kaisha, Japan) used for the decolorizing treatment of dye-containing waste water (containing various dyes, surfactants, sizing agents, oily agents used for dying rayon and nylon) was regenerated according to the method of this invention and the thermal regeneration method, respectively. The iodine adsorption and caramel decolorizing degree were determined with respect to each of virgin carbon, spent carbon and regenerated carbon. As the sample regenerated according to the method of this invention was used 62 g. of regenerated carbon obtained by treating 100 g. (62 g. in terms of fresh carbon) of spent carbon in the same manner as described in Example 1. As the comparative sample regenerated according to the thermal regeneration method, there was used 57 g. of regenerated carbon obtained by charging 100 g. of spent carbon into an electric furnace of the rotary kiln type, and heating it at a regeneration temperature of 850° C. for 15 minutes while feeding steam at a rate of 50 g/hr. Results of the measurements are shown in Table 5.

Table 5

| Test Item | Regenerated Carbon Thermal Regeneration Method | Regenerated Carbon Method of This Invention | Spent Carbon | Spent Carbon |
|---|---|---|---|---|
| Iodine Adsorption, mg/g | 1470 | 1500 | 740 | 1580 |
| Caramel Decolorizing Degree, % | 88 | 93 | 72 | 97 |

EXAMPLE 3

According to the method of this invention, 220 g. (95 g. in terms of virgin carbon) of powdered activated carbon (sold under tradename "Shirasagi DW" and manufactured by Takeda Yakuhin) used for the treatment of city sewage, which had a water content of 5%, was regenerated. More specifically, the spent carbon was charged into a 1-liter capaciyty pressure vessel equipped with a magnetic stirrer and 500 g of liquid dimethyl ether was introduced under pressure. Extraction was conducted for 30 minutes at a temperature of 25° C. and a pressure of 4.2 Kg/cm² under agitation (40 cycles per minute). Then, the treated activated carbon was separated from the dimethyl ether solution by cotton filtration, and the separated activated carbon was allowed to stand at 25° C. and 20 mm Hg for 60 minutes to remove dimethyl ether sticking onto the activated carbon. Thus was obtained 85 g. of the regenerated carbon sample.

The phenol adsorption (according to the method of JWWA K-113 for testing powdered activated carbon for city service water) and Methylene Blue adsorption were measured with respect to each of virgin carbon, spent carbon and regenerated carbon to give the results as shown in Table 6.

Table 6

| Test Item | Sample Virgin Carbon | Spent Carbon | Regenerated Carbon |
|---|---|---|---|
| Phenol Adsorption, mg/g | 50 | 34 | 47 |
| Methylene Blue Adsorption, mg/g | 253 | 141 | 250 |

EXAMPLE 4

Granular activated carbon (sold under tradename "Adgencoal" and manufactured by Adgen Kabushiki Kaisha) used for the treatment of decoloration of molasses was regenerated by the regeneration method of this invention. A pressure vessel having a capacity of 1 liter and equipped with a magnetic stirrer was charged with 100 g. (59 g. in terms of dried virgin carbon, a water content of 30%) of the above carbon. 94 g. of water and 80 g. of liquid dimethyl ether were introduced under pressure into the vessel. Extraction was conducted for 120 minutes at a temperature of 20° C. and a pressure of 4.2 Kg/cm² under agitation (50 cycles per minute). Thereafter, the activated carbon was separated from the dimethyl ether solution by filtration with cotton and left for 60 minutes at 60° C. and 20 mm Hg. The dimethyl ether adsorbed on the activated carbon was removed to give 66 g. (a water content of 10%) of a sample of regenerated carbon. The caramel decolorizing degree and Methylene Blue adsorption were measured with respect to each of regenerated carbon, virgin carbon and spent carbon. The results are shown in Table 7.

Table 7

| Test Item | Sample Virgin Carbon | Spent Carbon | Regenerated Carbon |
|---|---|---|---|
| Caramel Decolorizing Degree, % | 94 | 79 | 94 |
| Methylene Blue adsorption, mg/g | 253 | 182 | 249 |

EXAMPLE 5

A 1-liter capacity pressure vessel equipped with a magnetic stirrer was charged with 100 g. of a filtering agent containing powdered activated carbon and clay at a weight ration of 1:5, which had been used for decolorizing and refining of palm oil, and 300 g. of liquid dimethyl ether was introduced under pressure. Extraction regeneration was conducted for 30 minutes at a temperature of 25° C. and a pressure of 4.2 Kg/cm² under agitation (40 cycles per minute), and the filtering agent was separated from the dimethyl ether solution by cotton filtration. When dimethyl ether was evaporated, liquefied and recovered from the dimethyl ether solution by conducting fractional distillation with a temperature gradient of 50° – 18° C., 45 g. of the adsorbates were obtained. Separately, the washing liquid-containing filtering agent was allowed to stand for 30 minutes at 25° C. and 20 mm Hg to distill and remove the residual dimethyl ether. As a result, 55 g. of the filtering agent was recovered. Data of analysis values of the filtering agent determined before and after the dimethyl ether treatment are shown in Table 8.

Table 8

| Item | Sample before diemthyl ether treatment | after dimethyl ether treatment |
|---|---|---|
| water content | 8.0 % | 5.7 % |
| oil content | 38.2 % | — |
| powdered activated carbon content | 10.2 % | 17.9 % |
| clay content | 43.6 % | 76.4 % |

The regeneration method of this invention is characterized in that activated carbons are regenerated by liquid dimethyl ether. According to this invention, it is possible to regenerate activated carbons at room temperature without changing the phase or state where the activated carbons have been used for adsorption. Therefore, according to the method of this invention, powdered activated carbon which cannot be regenerated according to the thermal regeneration method can be effectively regenerated without regeneration loss. Further, according to the method of this invention, since it is possible to perform adsorption and regeneration steps continuously without shifting spent carbons, loss of the activated carbons by mechanical wearing can be effectively prevented. Still further, dimethyl ether used as the regenerating agent can be recovered very easily and used repeatedly. In case adsorbates include valuable substances, since dimethyl ether can easily be removed from the desorption liquid, it is possible to recover the valuable substances very easily. As is apparent from the foregoing, this invention provides an epoch-making method in which activated carbons can be regenerated much more effectively and economically advantageously than in conventional regeneration methods and which makes it possible to recover valuable substances from adsorbates very simply.

What is claimed is:

1. A method for the regeneration of activated carbon which comprises contacting an activated carbon having pollutants adsorbed therein with liquid dimethyl ether to desorb and separate the adsorbates from said activated carbon.

2. A method according to claim 1 wherein the liquid dimethyl ether is used with water.

3. A method according to claim 1 wherein said liquid dimethyl ether is employed in an amount of 0.5 to 50 g. per g. of the activated carbon.

4. A method according to claim 2 wherein the liquid dimethyl ether is employed with water in a ratio (dimethyl ether to water of 0.5 – 50 g. to 0.1 – 25 g. per g. of the activated carbon.

5. A method according to claim 4 wherein the amount of water exceeds saturation solubility to liquid dimethyl ether.

6. A method according to claim 1 wherein the contacting is effected for 5 – 60 minutes.

7. A method according to claim 1 wherein the dimethyl ether is subsequently removed by evaporation from the desorption liquid to recover valuable substances contained in the adsorbates.

* * * * *